United States Patent
Yoshimura

(10) Patent No.: US 9,505,905 B2
(45) Date of Patent: Nov. 29, 2016

(54) FLUORORUBBER COMPOSITION

(71) Applicant: NOK CORPORATION, Tokyo (JP)

(72) Inventor: Kenichi Yoshimura, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/420,595

(22) PCT Filed: Jul. 19, 2013

(86) PCT No.: PCT/JP2013/069600
§ 371 (c)(1),
(2) Date: Feb. 9, 2015

(87) PCT Pub. No.: WO2014/024661
PCT Pub. Date: Feb. 13, 2014

(65) Prior Publication Data
US 2015/0197619 A1    Jul. 16, 2015

(30) Foreign Application Priority Data

Aug. 10, 2012 (JP) ................................. 2012-177734

(51) Int. Cl.
C08K 3/34 (2006.01)
C08K 7/10 (2006.01)
C09K 3/10 (2006.01)

(52) U.S. Cl.
CPC . C08K 3/34 (2013.01); C08K 7/10 (2013.01); C09K 3/1009 (2013.01); *C08K 2201/016* (2013.01)

(58) Field of Classification Search
CPC . C08K 7/10; C08K 2201/016; C09K 3/1009
See application file for complete search history.

(56) References Cited

U.S. PATENT DOCUMENTS 4,530,881 A * 7/1985 Santoso .................... C08K 3/34 428/421
6,177,504 B1 * 1/2001 Atkinson ............. C09K 3/1028 524/443
2011/0251320 A1 * 10/2011 Nasreddine .............. C08K 3/34 524/236
2011/0291365 A1 * 12/2011 Hirose ..................... C08K 5/14 277/500

FOREIGN PATENT DOCUMENTS

| CN | 1982366 A | | 6/2007 |
|----|-----------|---|--------|
| CN | 102504448 A | * | 6/2012 |
| JP | 61-012741 | | 1/1986 |
| JP | 02-206639 | | 8/1990 |
| JP | 2002-212370 | | 7/2002 |
| JP | 2007-186676 | | 7/2007 |
| JP | 2008-064201 | | 3/2008 |
| JP | 2008-144061 | | 6/2008 |

OTHER PUBLICATIONS

Pro Quest machine translation of CN102504448 A, Dec. 2015.*
"TREMIN 283 Wollastonite", Quarzwerke GmbH, date unknown.*
International Search Report from corresponding PCT application No. PCT/JP2013/069600 dated Oct. 1, 2013 (3 pgs).
International Preliminary Report on Patentability and Written Opinion from corresponding PCT application No. PCT/JP2013/069600 dated Feb. 10, 2015 (5 pgs).

* cited by examiner

Primary Examiner — Nicole M Buie-Hatcher
(74) Attorney, Agent, or Firm — Brinks Gilson & Lione

(57) ABSTRACT

A fluororubber composition comprising 1 to 100 parts by weight of a needle-like filler or fibrous filler having an average particle diameter of 5 μm or less, an average particle length of 40 to 60 μm, and an aspect ratio of 10 to 12, based on 100 parts by weight of fluororubber. A fluororubber vulcanization-molded product obtained from the fluororubber composition has resistance against deformation due to the shape effect of the filler, and thereby can suppress the deformation of the oil seal sliding surface towards the sliding direction. More specifically, the fluororubber vulcanization-molded product can achieve less friction, while maintaining sealing properties by increasing the amount of oil pumping, from the initial use of an oil seal to after the abrasion of the oil seal.

3 Claims, No Drawings

FLUORORUBBER COMPOSITION

RELATED APPLICATION

This application is a 35 U.S.C. §371 national phase filing of International Patent Application No. PCT/JP2013/069600, filed Jul. 19, 2013, through which and to which priority is claimed under 35 U.S.C. §119 to Japanese Patent Application No. 2012-177734, filed Aug. 10, 2012, the entire disclosure of which is hereby expressly incorporated by reference.

TECHNICAL FIELD

The present invention relates to a fluororubber composition. More particularly, the present invention relates to a fluororubber composition that can be effectively used as a molding material for rotary sliding seal products, such as oil seals.

BACKGROUND ART

Oil seals are widely used as essential machine elements in the fields of vehicles, industrial machines, etc. In recent years, there is an increasing demand for eco-friendly vehicles and like products that are fuel-efficient and low resistant. Oil seals used in various machines are also required to have less friction.

Conventionally, friction was reduced by applying coating or PTFE sintering to oil seal surfaces; however, according to this method, it was necessary to add a coating or sintering process to the production process of oil seals, which caused a problem of increased cost. Further, it was difficult to apply them to some oil seals, depending on their shape. Alternatively, it is also possible to seek less friction by means of the shape and structure thereof; however, this may cause a problem of reduced sealing properties due to a decrease of interference, etc.

The present applicant has proposed various fluororubber compositions in which fluororubber is blended with fillers having specific shapes so as to improve their sealing properties and impact-absorbing properties, etc.

Patent Document 1 discloses a fluororubber composition comprising fluororubber and potassium titanate whisker having an approximate composition $K_2O\cdot(TiO_2)_n$ (n: an integer of 1 or more, preferably 4 to 8) and generally having an average fiber length of about 10 to 20 µm and a fiber diameter of about 0.2 to 0.5. This fluororubber composition has improved material strength and abrasion resistance, and can be suitably used as a molding material for rotating seals, reciprocating seals, and the like.

Patent Document 2 discloses an oil seal for forward/reverse rotation comprising fluororubber, and wollastonite produced in the U.S. or Mexico, or potassium titanate whisker having an aspect ratio of 8 or more. This oil seal can continuously seal fluid well in forward/reverse rotation movement, even under relatively high temperature conditions (e.g., a service condition temperature of 100 to 200° C.).

The Examples of Patent Document 2 use wollastonite having an aspect ratio of 8 (fiber length: about 32 µm, fiber diameter: 4 µm), 13 (fiber length: 65 µm, fiber diameter: 5 µm), or 17 (fiber length: 136 µm, fiber diameter: 8 µm), and the Comparative Example uses wollastonite having an aspect ratio of 5 (fiber length: 35 µm, fiber diameter: 7 µm).

Patent Document 3 discloses a fluororubber composition suitable for rotary sliding seal applications with the aim to reduce torque (reduction in friction), to improve the initial characteristics of sealing properties by reducing oil leakage (measuring the amount of oil pumping with sliding of the seal member as the time from the supply of oil to the termination of inlet), and to suppress the degradation of the characteristics after friction and abrasion occur. The fluororubber composition comprises a fluororubber blended product of polyol-crosslinkable fluororubber and peroxide-crosslinkable fluororubber, and a polyol-based crosslinking agent or a mixture of a polyol-based crosslinking agent and a peroxide crosslinking agent, depending on the blending ratio.

Patent Document 3 indicates that the fluororubber composition may suitably contain, as rubber compounding agents, a reinforcing agent, such as carbon black or carbon fibers; a filler, such as hydrotalcite, calcium carbonate, magnesium carbonate, aluminum hydroxide, magnesium hydroxide, aluminum silicate, magnesium silicate, calcium silicate, potassium titanate, titanium oxide, barium sulfate, aluminum borate, glass fibers, aramid fibers, diatomaceous earth, or wollastonite; and the like. The Examples of Patent Document 3 uses wollastonite (fiber length: 35 µm, fiber diameter: 7 µm).

Patent Document 4 discloses a fluororubber vulcanization-molded product comprising fluororubber and a filler having a specific shape, wherein the product has a slight increase in hardness and has excellent impact-absorbing properties and non-adhesiveness. Patent Document 4 indicates that the filler having a specific shape is a filler having an average particle diameter of 1 to 50 µm, preferably 5 to 30 µm, and an aspect ratio of 5 or more, or a fibrous or needle-like filler having an average fiber length of 1 to 500 µm, preferably 5 to 200 µm.

As the filler to be blended with the fluororubber, Patent Document 4 refers to calcium carbonate, aluminum silicate, magnesium silicate, wollastonite (calcium silicate), xonotlite (calcium silicate), talc, mica, sericite, glass flakes, various metallic foils, graphite, plate-like iron oxide, plate-like calcium carbonate, plate-like aluminum hydroxide, glass fibers, carbon fibers, aramid fibers, vinylon fibers (PVA fibers), alumina fibers, metal fibers, plaster fibers, phosphate fibers, dawsonite, aluminum borate, potassium titanate, needle-like magnesium hydroxide, and the like. As the fibrous filler, Patent Document 4 refers to glass fibers, carbon fibers, aramid fibers, vinylon fibers, alumina fibers, metal fibers, and the like. As the needle-like filler, Patent Document 4 refers to potassium titanate, wollastonite, zonolite, phosphate fibers, plaster fibers, dawsonite, aluminum borate, needle-like MgO, magnesium hydroxide, calcium carbonate, aluminum silicate, magnesium silicate, and the like.

The Examples of Patent Document 4 use calcium silicate (average diameter: 3 µm, average length: 25 µm), carbon fibers (average fiber diameter: 15 µm, average fiber length: 150 µm), or calcium carbonate (average particle diameter: 1 µm, average length: 5 µm).

PRIOR ART DOCUMENTS

Patent Documents

Patent Document 1: JP-A-H2-206639
Patent Document 2: JP-A-2008-064201
Patent Document 3: JP-A-2008-144061
Patent Document 4: JP-A-2002-212370
Patent Document 5: JP-A-561-12741

OUTLINE OF THE INVENTION

Problem to be Solved by the Invention

An object of the present invention is to provide a fluororubber composition suitably used as a sealing material that can achieve less friction, while maintaining sealing properties by increasing the amount of oil pumping, from the initial use of an oil seal to after the abrasion of the oil seal.

Means for Solving the Problem

The above object of the present invention can be achieved by a fluororubber composition comprising 1 to 100 parts by weight of a needle-like filler or fibrous filler having an average particle diameter of 5 μm or less, an average particle length of 40 to 60 μm, and an aspect ratio of 10 to 12, based on 100 parts by weight of fluororubber.

Effect of the Invention

A fluororubber vulcanization-molded product obtained from the fluororubber composition of the present invention has resistance against deformation due to the shape effect of the filler, and thereby can suppress the deformation of the oil seal sliding surface towards the sliding direction. This molded product also has an effect of reducing torque after abrasion by producing an excellent lubrication state on the sliding surface. Here, different from surface treatment, such as coating or PTFE sintering, the effect obtained by the present invention is less friction due to a filler; therefore, the fluororubber vulcanization-molded product obtained from the fluororubber composition has a continuous low-friction effect lasting from the initial use to after abrasion, and shows excellent torque values even after abrasion by use, while maintaining sealing properties by increasing the amount of oil pumping.

EMBODIMENTS FOR CARRYING OUT THE INVENTION

The fluororubber used herein may be either a polyol-vulcanizable fluororubber or a peroxide-crosslinkable fluororubber; however, a polyol-vulcanizable fluororubber is preferably used.

The polyol-vulcanizable fluororubber includes, for example, homopolymers of vinylidene fluoride, hexafluoropropene, pentafluoropropene, trifluoroethylene, trifluorochloroethylene, tetrafluoroethylene, vinyl fluoride, perfluoroacrylic acid ester, perfluoroalkyl acrylate, perfluoro(methyl vinyl ether), perfluoro(ethyl vinyl ether), perfluoro(propyl vinyl ether), etc.; their alternating copolymers or their copolymers with propylene. Preferable are vinylidene fluoride-hexafluoropropene copolymer, vinylidene fluoride-hexafluoropropene-tetrafluoroethylene terpolymer, tetrafluoroethylene-propylene copolymer, etc. Practically, commercially available polyol-vulcanizable fluororubber can be generally used as such.

The fluororubber that can be crosslinked with peroxide (peroxide-crosslinkable fluororubber) may be any fluorine-containing elastomer that has a fluorine content of 63 to 71 wt. % and a Mooney viscosity $ML_{1+10}$ (121° C.) of 20 to 100, and that contains iodine and/or bromine as a crosslinking site in the molecule; and the following copolymer elastomers are preferably used.

A copolymer elastomer having a copolymerization composition of about 50 to 80 mol % of vinylidene fluoride, about 15 to 50 mol % of hexafluoropropene, and about 30 to 0 mol % of tetrafluoroethylene, into which an iodine and/or bromine group is introduced.

Practically, Viton GAL200S, GBL200S, GBL600S, GF200S, and GF600S produced by Du Pont, Tecnoflon P457, P757, P459, and P952 produced by Solvay Solexis, DAI-EL G952, G901, G902, G912, and G801 produced by Daikin Industries, Ltd., and other commercial products can be used as they are.

A copolymer elastomer having a copolymerization composition of about 50 to 85 mol % of vinylidene fluoride, about 5 to 50 mol % of perfluorovinylether represented by the general formula: $CF_2$=CFORf (Rf: a perfluoroalkyl group having 1 to 10 carbon atoms, preferably a perfluoromethyl group or a perfluorooxyalkyl group having one or more ether bonds in the carbon chain), and about 50 to 0 mol % of tetrafluoroethylene, into which an iodine and/or bromine group is introduced.

Practically, Viton GLT200S, GLT600S, GBLT200S, GBLT600S, GFLT200S, and GFLT600S produced by Du Pont, Tecnoflon PL455, PL855, PL557, PL458, and PL958 produced by Solvay Solexis, DAI-EL LT302 and LT301 produced by Daikin Industries, Ltd., and the like can be used as they are.

The introduction of an iodine and/or bromine group for enabling peroxide crosslinking of the fluororubber can be carried out by a copolymerization reaction in the presence of an iodine and/or bromine group-containing saturated or unsaturated compound.

When a bromine and/or iodine group is contained as a side chain of a fluorine-containing copolymer, examples of such a copolymer include perfluoro(2-bromoethyl vinyl ether), 3,3,4,4-tetrafluoro-4-bromo-1-butene, 2-bromo-1,1-difluoroethylene, bromotrifluoroethylene, perfluoro(2-iodoethyl vinyl ether), iodotrifluoroethylene, and other crosslinking site-forming monomer.

When an iodine and/or bromine group is contained as the terminal group of a fluorine-containing copolymer, a fluoroalkylene compound halogenated at both ends represented by the general formula: $X_1C_nF_{2n}X_2$ ($X_1$: F, Br, or I; $X_2$: Br or I; and n: 1 to 12) is used. In terms of the balance of reactivity and handling, copolymers, wherein n is 1 to 6, containing an iodine and/or bromine group derived from 1-bromoperfluoro ethane, 1-bromoperfluoropropane, 1-bromoperfluorobutane, 1-bromoperfluoropentane, 1-bromoperfluorohexane, 1-iodoperfluoroethane, 1-iodoperfluoropropane, 1-iodoperfluorobutane, 1-iodoperfluoropentane, and 1-iodoperfluorohexane are preferably used.

Moreover, when $X_1$ and $X_2$ are I and/or Br, a crosslinking site can be introduced into the terminal position of a fluorine-containing copolymer. Examples of such a compound include 1-bromo-2-iodotetrafluoroethane, 1-bromo-3-iodoperfluoropropane, 1-bromo-4-iodoperfluorobutane, 2-bromo-3-iodoperfluorobutane, monobromomonoiodoperfluoropentane, monobromomonoiodoperfluoro-n-hexane, 1,2-dibromoperfluoroethane, 1,3-dibromoperfluoropropane, 1,4-dibromoperfluorobutane, 1,5-dibromoperfluoropentane, 1,6-dibromoperfluorohexane, 1,2-diiodoperfluoroethane, 1,3-diiodoperfluoropropane, 1,4-diiodoperfluorobutane, 1,5-diiodoperfluoropentane, 1,6-diiodoperfluorohexane, and the like. These compounds can also be used as chain transfer agents.

The fluororubber is blended with a needle-like filler or fibrous filler having an average particle diameter (measured by a laser scattering method; corresponding to the average fiber diameter of the fibrous filler) of 5 μm or less, preferably 3 to 5 μm, an average particle length (measured by an optical microscope; corresponding to the average fiber length of the fibrous filler) of 40 to 60 μm, and an aspect ratio of 10 to 12, at a ratio of 1 to 100 parts by weight, preferably 30 to 60 parts by weight, based on 100 parts by weight of the fluororubber. When the amount of the filler is less than this range, the sealing properties after abrasion due to use, which are the object of the present invention, cannot be maintained. In contrast, an amount of the filler greater than this range is not preferable, because the hardness of the rubber increases, impairing the followability of the seal. Moreover, when a filler having an average particle diameter greater than this range is used, the removal of the filler from the sliding surface may cause gap leakage. As a result, even though torque values after abrasion due to use can be maintained, sealing properties may be reduced. When a filler having an average particle length outside of this range is used, torque values after abrasion are deteriorated.

The above patent documents disclose fluororubber compositions in which fluororubber is blended with various fillers having different average particle diameters and average fiber lengths, and each of the compositions achieves the desired object; however, as shown in Comparative Examples provided below, when the average particle diameter and/or the average particle length are outside of the ranges specified in the present invention, it is difficult to secure the desired sealing properties shown as sliding torque values, pumping amounts, and seal test results. Further, when the aspect ratio is outside of the range specified in the present invention, it is difficult to secure sealing properties, as well.

Here, examples of the needle-like filler or fibrous filler include wollastonite, carbon fibers, glass fibers, alumina fibers, fibrous sepiolite, potassium titanate whisker, silicon carbide whisker, silicon nitride whisker, basic magnesium sulfate, and the like; preferably used is wollastonite.

Among these fillers having specific shapes, wollastonite is preferably used. Wollastonite is natural calcium (meth) silicate found in metamorphic rocks, and has a composition formula: $Ca_3[Si_3O_9]$. The shape of wollastonite is mostly fibrous and slightly plate-like.

When a polyol-vulcanizable fluororubber is used as the fluororubber, a polyol-based vulcanizing agent is used preferably in combination with a vulcanization accelerator. When a peroxide-crosslinkable fluororubber is used as the fluororubber, an organic peroxide crosslinking agent is used preferably in combination with a polyfunctional unsaturated compound.

The polyol-based vulcanizing agent for use as a vulcanizing agent for the polyol-vulcanizable fluororubber includes, for example, 2,2-bis(4-hydroxyphenyl)propane [bisphenol A], 2,2-bis(4-hydroxyphenyl)perfluoropropane [bisphenol AF], bis(4-hydroxyphenyl)sulfone [bisphenol S], 2,2-bis(4-hydroxyphenyl)methane [bisphenol F], bisphenol A-bis(diphenylphosphate), 4,4'-dihydroxydiphenyl, 2,2-bis (4-hydroxyphenyl)butane, etc. Preferable are bisphenol A, bisphenol AF, etc. They can be in the form of alkali metal salts or alkaline earth metal salts. The polyol-based vulcanizing agent can be used generally in a proportion of about 2 to about 20 parts by weight, preferably about 2.5 to about 15 parts by weight, on the basis of 100 parts by weight of polyol-vulcanizable fluororubber. The polyol-based vulcanizing agent can be also used as a master batch with the fluororubber.

The vulcanization accelerator includes quaternary onium salts such as quaternary phosphonium salts or quaternary ammonium salts. Preferable are quaternary phosphonium salts. The onium salt can be used in a proportion of about 0.5 to about 10 parts by weight, preferably about 1 to about 5 parts by weight, on the basis of 100 parts by weight of polyol-vulcanizable fluororubber. The vulcanization accelerator can be also used as a master batch with the fluororubber.

The quaternary phosphonium salts are compounds represented by the following general formula:

$$[PR_1R_2R_3R_4]^+X^-$$

(where $R_1$ to $R_4$ are alkyl groups having 1-25 carbon atoms, alkoxyl groups, aryl groups, alkylaryl groups, aralkyl groups or polyoxyalkylene groups, two or three of which can form a heterocyclic group together with P, and X is an anion of $Cl^-$, $Br^-$, $I^-$, $HSO_4^-$, $H_2PO_4^-$, $RCOO^-$, $ROSO_2^-$, $CO_3^{2-}$, etc.) and include, for example, tetraphenylphosphonium chloride, benzyltriphenylphosphonium bromide, benzyltriphenylphosphonium chloride, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethylphosphate, etc. The quaternary phosphonium salts can be equimolar molecular compounds with active hydrogen-containing aromatic compounds such as polyhydroxyaromatic compounds, etc., as disclosed in Patent Document 5.

The quaternary ammonium compounds are compounds represented by the following general formula:

$$[NR_1R_2R_3R_4]^+X^-$$

(where $R_1$-$R_4$ and $X^-$ are the same meanings as defined above) and include, for example, 1-alkylpyridinium salts, 5-aralkyl-1,5-diazabicyclo[4,3,0]-5-nonenium salts, 8-aralkyl-1,8-diazabicyclo[5,4,0]-7-undecenium salts, etc.

Examples of the organic peroxide include dicumyl peroxide, cumene hydroperoxide, p-methane hydroperoxide, 2,5-dimethylhexane-2,5-dihydroperoxide, di-tert-butyl peroxide, benzoyl peroxide, m-toluyl peroxide, 2,5-dimethyl-2,5-di(tert-butylperoxy)hexane, 2,5-dimethyl-2,5-di(tert-butylperoxy)hexyne-3, 1,3-di(tert-butylperoxyisopropyl) benzene, 2,5-dimethyl-2,5-dibenzoylperoxyhexane, (1,1,3, 3-tetramethylbutylperoxy)2-ethylhexanoate, tert-butyl peroxybenzoate, tert-butyl peroxylaurate, di(tert-butylperoxy)adipate, di(2-ethoxyethylperoxy)dicarbonate, bis-(4-tert-butylcyclohexylperoxy)dicarbonate, and the like. Such an organic peroxide is used at a ratio of 0.5 to 10 parts by weight, preferably 1 to 5 parts by weight, based on 100 parts by weight of fluororubber.

For the peroxide crosslinking by organic peroxide, it is preferable to use a polyfunctional unsaturated compound in combination. Examples of such a polyfunctional unsaturated compound include tri(meth)allyl isocyanurate, tri(meth)allyl cyanurate, triallyl trimellitate, N,N'-m-phenylenebismaleimide, diallyl phthalate, tris(diallylamine)-s-triazine, triallyl phosphite, ethyleneglycol di(meth)acrylate, diethyleneglycol di(meth)acrylate, neopentylglycol di(meth)acrylate, trimethylolpropane tri(meth)acrylate, 1,3-polybutadiene, and the like. Such a polyfunctional unsaturated compound improves mechanical strength, compression set, etc. and is used at a ratio of about 0.1 to 20 parts by weight, preferably about 0.5 to 10 parts by weight, based on 100 parts by weight of fluororubber. Here, (meth)allyl refers to allyl or methallyl. Similarly, (meth)acrylate refers to acrylate or methacrylate.

Various compounding agents required for vulcanization operation, physical properties, and function are further added, if necessary, to the fluororubber composition comprising the above components. For example, a reinforcing agent such as carbon black, a filler such as diatomaceous earth or silica, an acid accepter such as an oxide or hydroxide of a divalent metal or hydrotalcite, and other necessary compounding agents are blended, and the resultant is kneaded by any kneading means using an open roll, kneader, etc., to prepare a composition. The composition is then subjected to heat pressing at 160 to 200° C. for 3 to 30 minutes, and optionally to secondary vulcanization at 150 to 250° C. for 0.5 to 24 hours. As a result, the composition is vulcanization-molded into an oil seal.

EXAMPLES

The following describes the present invention with reference to Examples.

Example

| | |
|---|---|
| Fluororubber (Viton A-500, produced by DuPont Dow Elastomers) | 100 parts by weight |
| Diatomaceous earth (Silika 6B, produced by Chuo Silika Co., Ltd.) | 15 parts by weight |
| Wollastonite (NYGLOS 4W, produced by NYCO Minerals; average particle diameter: 4.5 µm, average particle length: 50 µm, and aspect ratio: 11) | 35 parts by weight |
| Carbon black | 2 parts by weight |
| Carnauba wax (VPA No. 2, produced by DuPont Dow Elastomers) | 2 parts by weight |
| Calcium hydroxide | 3 parts by weight |
| Magnesium oxide | 6 parts by weight |
| Bisphenol AF (Curative #30, produced by DuPont Dow Elastomers) | 2.5 parts by weight |
| Phosphonium salt (Curative VC #20, produced by DuPont Dow Elastomers) | 1.2 parts by weight |

The above components were kneaded by a kneader, and subjected to primary vulcanization at 180° C. for 4 minutes and secondary vulcanization at 200° C. for 15 hours, thereby vulcanization-molding an oil seal (inner diameter: 95 mm, outer diameter: 113 mm, and width: 8.5 mm).

Comparative Example 1

In the Example, the same amount of NYGLOS 8 (produced by NYCO Minerals; average particle diameter: 8 µm, average particle length: 136 µm, and aspect ratio: 17) was used as wollastonite.

Comparative Example 2

In the Example, 55 parts by weight of NYAD400 (produced by NYCO Minerals; average particle diameter: 7 µm, average particle length: 35 µm, and aspect ratio: 5) was used as wollastonite.

Comparative Example 3

In the Example, the same amount of NYAD1250 (produced by NYCO Minerals; average particle diameter: 3 µm, average particle length: 9 µm, and aspect ratio: 3) was used as wollastonite.

Comparative Example 4

In the Example, 55 parts by weight of NYAD325 (produced by NYCO Minerals; average particle diameter: 10 µm, average particle length: 50 µm, and aspect ratio: 5) was used as wollastonite.

Comparative Example 5

In the Example, the amount of diatomaceous earth was changed to 45 parts by weight, and wollastonite was not used.

(a) Oil seals (new products) obtained in the above Example and Comparative Examples and (b) oil seals (abraded products) whose seal lips were forcibly abraded with sandpaper wound around a rotating shaft with an aim to achieve an abrasion loss of 400 µm, were subjected to the measurements of sliding torque and the amount of oil pumping, and to a seal test. The amount of oil pumping was measured in the state shown in FIG. 1 of Patent Document 3.

Sliding torque: Each of the oil seals or the forcibly-abraded oil seals was set in a rotation tester after its dust lip was removed. Lubricating oil (Toyota Genuine Castle Oil SM Grade 0W-20) was sealed in a state in which the amount of oil was 1 cm below the shaft in the shaft center. A rotation test was performed at an oil temperature of 80° C. at a rotational frequency of 3,000 rpm for 20 minutes, and the torque value applied to the seal during the rotation test was measured by a load cell attached to the oil seal.

Pumping amount: Each of the oil seals (new products) or the forcibly-abraded oil seals (abraded products) was subjected to a rotation test in the same manner as in the test for measuring sliding torque (except that the rotational frequency was changed to 2,000 rpm). A fixed amount of oil was supplied into the seal lip part using a syringe, etc., in a state in which the oil was absorbed into the lip (normal attachment state). The time from the start of the oil supply to the termination of absorption was measured 3 times, and the pumping amount (ml/hour) was calculated using the following formula:

Supply amount (g)/oil density (g/ml)/(time taken for absorption (second)×3600)

Seal test: The occurrence of oil leakage at a rotational frequency of 3,000 rpm was visually confirmed (shown as the number of oil-leaking test pieces among two test pieces).

The following table shows the measurement results obtained in the above Example and Comparative Examples.

TABLE

| Measurement item | Ex. | Comp. Example | | | | |
| | | 1 | 2 | 3 | 4 | 5 |
|---|---|---|---|---|---|---|
| [Sliding torque value] | | | | | | |
| New product (N · cm) | 26 | 29 | 31 | 35 | 29 | 32 |
| Abraded product (N · cm) | 47 | 53 | 49 | 51 | 47 | 45 |
| [Pumping amount] | | | | | | |
| New product (ml/h) | 6.8 | 5.5 | — | 3.8 | 3.9 | 2 |
| Abraded product (ml/h) | 14.3 | 7.3 | 6 | 5.5 | 7.2 | 4.3 |
| [Seal test] | | | | | | |
| New product | 0/2 | 1/2 | 2/2 | 0/2 | 1/2 | 0/2 |
| Abraded product | 0/2 | 0/2 | 0/2 | 0/2 | 0/2 | 0/2 |

INDUSTRIAL APPLICABILITY

An oil seal obtained by vulcanization-molding of the fluororubber composition of the present invention can be effectively used as a molding material for rotary sliding seal products, including engine oil seals for transportation equipment, such as vehicles.

The invention claimed is:

1. A fluororubber composition comprising 35 to 100 parts by weight of a wollastonite having an average particle diameter of 5 μm or less, an average particle length of 40 to 60 μm, and an aspect ratio of 11 to 12, based on 100 parts by with of fluororubber.

2. A seal material vulcanization-molded from the fluororubber composition according to claim 1.

3. An engine oil seal vulcanization molded from the seal material of claim 2.

* * * * *